United States Patent [19]

Motteram et al.

[11] Patent Number: 5,211,745
[45] Date of Patent: May 18, 1993

[54] NICKEL PROCESSING

[75] Inventors: Geoffrey M. Motteram, Dalkeith; Gavin S. M. Becker; Michael W. Ryan, both of Darlington, all of Australia

[73] Assignee: Dominion Mining Limited, Western Australia, Australia

[21] Appl. No.: 893,740

[22] Filed: Jun. 5, 1992

[30] Foreign Application Priority Data

Jun. 7, 1991 [AU] Australia .............................. PK6571
Mar. 13, 1992 [AU] Australia .............................. PL1312

[51] Int. Cl.$^5$ .............................................. C22B 3/00
[52] U.S. Cl. ............................................................ 75/743
[58] Field of Search .......................................... 75/738

[56] References Cited

U.S. PATENT DOCUMENTS

| | | | |
|---|---|---|---|
| 2,829,965 | 4/1958 | Castagna | 75/738 |
| 3,305,353 | 2/1967 | Duncan | 75/738 |
| 3,765,873 | 10/1973 | Sato et al. | 78/82 |
| 3,804,613 | 4/1974 | Zundel et al. | 75/101 |
| 4,006,215 | 2/1977 | Hall et al. | 423/142 |
| 4,828,809 | 5/1989 | Thomassen | 75/738 |
| 4,906,293 | 3/1990 | Eldred | 75/738 |

FOREIGN PATENT DOCUMENTS

33283/89 4/1988 Australia.

OTHER PUBLICATIONS

PCT International-Type Search Report—International Application No. PK 6571.

Primary Examiner—Peter D. Rosenberg
Attorney, Agent, or Firm—Merchant, Gould, Smith, Edell, Welter & Schmidt

[57] ABSTRACT

A method of processing intermediate nickel bearing products, the method comprising subjecting the intermediate nickel bearing products to an acid leach in order to dissolve substantially all of the acid soluble magnesium bearing minerals contained therein to provide an upgraded nickel bearing residue and a leach solution. The method is particularly suitable where the intermediate nickel bearing products are nickel sulphide concentrates or nickel iron oxide calcine.

14 Claims, No Drawings

NICKEL PROCESSING

The present invention relates to the processing of nickel ores. In particular, the invention relates to the upgrading of intermediate nickel-bearing products by the reduction of the levels of MgO and/or $SiO_2$.

Nickel sulphide mineralisation contained within ultramafic and mafic rock types which have been subjected to gradual hydrothermal and carbonate alteration tend to produce flotation concentrates and (after subsequent processing) roasting products with significant magnesium oxide (MgO) and silica/magnesium oxide ($MgO/SiO_2$) based contamination. Generally the MgO contamination is in the form of carbonate and hydroxide minerals such as magnesite, brucite, pyroaurite and dolomite, while the $MgO/SiO_2$ contamination is generally in the form of serpentine minerals.

Referring specifically to the flotation concentrates, excess magnesia results in significant cost penalties during smelting due to the magnesia content causing viscous slags. In turn, this results in a need for higher smelting temperatures with consequent increased energy and refractory costs. As a result of this problem there can be a rejection of concentrates with excess magnesia from certain smelters, thus limiting the marketability of the concentrate. Furthermore, high magnesia levels in pressure leaching of concentrates can lead to foaming and/or magnesium related precipitates on apparatus such as heat exchangers and the like.

Rejection of magnesium bearing gangue minerals from flotation concentrates has traditionally been attempted by the use of talc depressants in the flotation process. However, the general degree of success of this step varies with the nature of a deposit and some deposits have proven uneconomic to develop, due to both relatively low nickel grades (0.2 to 1.0% Ni) and high MgO grades in the concentrate (>7% MgO), hence the smelter magnesia cost penalties referred to above. Further, the talc depressants used in flotation are sometimes more effective in rejecting magnesium bearing silicate minerals, rather than carbonates or hydroxides. Alternatively, development may not have proceeded due to an inability to market the concentrates because of excess magnesia levels.

Referring specifically to the roasting products (the calcine), high levels of $MgO/SiO_2$ again incur significant cost penalties during the subsequent pyrometallurgical treatment of the calcines by the currently operating facilities, during the production of ferro-nickel (the MgO increases slag viscosities, thus requiring more heat and an increased consumption of refractory materials), and also during the direct charging of nickel calcine into stainless and alloy steel production (the $MgO/SiO_2$ requiring more heat input and increased slag volume).

While the present invention has particular relevance to sulphide bearing deposits having relatively low nickel head grades, nickel also occurs in sulphide bearing deposits having relatively high nickel head grades. Even though these deposits are traditionally more economic and are presently being mined in existing mines, some remain subject to the above difficulties due to the presence of high levels of magnesia in the concentrate.

It will be understood by a person skilled in the art that reference to magnesium or magnesium bearing minerals includes reference to what is commonly referred to, and assayed as, magnesia (or MgO) or magnesia bearing minerals.

It will also be understood that the term "intermediate nickel-bearing products" as used throughout this specification refers to the various nickel-bearing products that are produced at different stages within a nickel processing plant. In particular, the term includes nickel sulphide concentrates such as nickel sulphide flotation concentrates, and nickel calcine such as nickel iron oxide calcine produced during roasting of the sulphide concentrates.

The aim of the present invention is to provide a method of processing intermediate nickel-bearing products to produce an upgraded nickel product having a reduced MgO and/or $MgO/SiO_2$ content, thus avoiding, or at least reducing the effect of, the above mentioned difficulties.

The present invention provides a method of processing intermediate nickel bearing products, said method comprising subjecting the intermediate nickel bearing products to an acid leach in order to dissolve substantially all of the acid soluble magnesium bearing minerals contained therein to provide an upgraded nickel bearing residue and a leach solution.

In a first aspect of the invention, where the method subjects nickel sulphide concentrates to an acid leach, the upgraded nickel concentrate residue provides a concentrate having a higher nickel concentration and a lower magnesia concentration than the initial concentrate. The residue has an increased contained value of nickel per unit of weight of concentrate due to the removal of the acid soluble minerals.

In a second aspect of the invention, where the method subjects nickel iron oxide calcine to an acid leach, the upgraded calcine residue provides a calcine having a higher nickel concentration and a lower $MgO/SiO_2$ concentration than the feed nickel iron oxide calcine. The residue again has an increased contained value of nickel per unit of weight of concentrate due to the significant reduction of MgO and $SiO_2$ levels.

In the preferred form of the invention, the acid leach utilises sulphuric acid. However, the invention is not limited to the use of sulphuric acid, and tests with high chloride ion bearing water indicate that hydrochloric acid provides similar benefits, as may sulphurous acid. Further, while the optimal acid leach conditions will depend upon the characteristics of the concentrate or calcine being treated, it will be understood that sufficient acid must be present in order to dissolve most of the soluble magnesium bearing minerals present in the concentrate, and the soluble $MgO/SiO_2$ components present in the calcine.

In the first aspect of the invention in particular, the sulphuric acid dissolves substantially all of the major acid soluble gangue minerals, and may also attack composites of sulphide and gangue along grain boundaries, hence contributing to further sulphide liberation and possible benefits from reflotation. However, during the subsequent roasting of the concentrate, the concentrate is oxidised and a porous product results. Thus, in the second aspect of the invention the sulphuric acid chemically attacks the $MgO/SiO_2$ components of the calcine with minimal dissolution of valuable nickel and other base metal units.

The present invention is particularly applicable to nickel mineralisation in dunite rock types which have been subjected to hydrothermal carbonate alteration, such as the currently undeveloped Yakabindie deposit in Western Australia. However, the invention will of course have potential for application to upgrading of nickel sulphide concentrates or nickel iron oxide calcines from other nickel ore bodies contained within rocks which have been subjected to carbonate alteration, and may also be used to reduce smelting costs associated with concentrates or calcine from currently operating mines.

In particular, by subjecting the flotation concentrates obtained from the Yakabindie and similar deposits referred to above to the acid leach of the invention, utilising sulphuric acid, an upgraded concentrate is produced which has a decreased magnesia concentration and an increased contained value of nickel per unit of intermediate nickel-bearing product weight. Due to this decreased weight and increased contained value of the concentrate, both land and sea freight costs, where applicable, together with handling and retreatment charges are reduced per unit of contained nickel. The marketability to nickel smelters and refineries is enhanced due to being able to provide a higher value concentrate containing less magnesia, which results in reduced pyrometallurgical and/or hydrometallurgical treatment costs per tonne of concentrate.

Furthermore, by subjecting the nickel iron oxide calcine obtained from the Yakabindie and similar deposits referred to above (regardless of whether or not the previously obtained concentrate has been subjected to the acid leach of the invention) to the sulphuric acid leach, a further upgraded calcine is produced which has a decreased $MgO/SiO_2$ concentration and an increased contained value of calcine per unit weight. Again, this decreased weight and increased contained value of calcine results in reduced charges for land and/or sea freighting and handling per unit of contained metal.

Of course, the benefits of the present invention are substantially increased where the acid leach of the concentrates is used in conjunction with the acid leach of the calcine after roasting Thus, the present invention also provides a method of processing nickel sulphide concentrates, said method comprising extracting rock from a nickel ore body, subjecting the extracted rock to normal beneficiation processes, said beneficiation processes including crushing, grinding, flotation and thickening, to produce a nickel sulphide flotation concentrate, and subjecting the nickel sulphide flotation concentrate to an acid leach using sulphuric acid in order to dissolve substantially all of the acid soluble magnesium bearing minerals contained therein to provide an upgraded nickel concentrate residue and a leach solution.

Of course, the present invention also provides a method of processing nickel iron oxide calcine produced after roasting of an upgraded nickel concentrate residue, said method comprising subjecting the nickel iron oxide calcine to an acid leach with sulphuric acid, the upgraded calcine residue providing a calcine having a higher nickel concentration and a lower $MgO/SiO_2$ concentration than the feed nickel iron oxide calcine.

Depending upon the characteristics and composition of the intermediate nickel-bearing products, the leach solution may also contain economic levels of valuable base metals, including minor levels of nickel. While such dissolution of base metals may be minimised by use of lower acid strengths and/or minimum excess acid conditions, the present invention may be adapted to include the additional step of subjecting the separated leach solution to known methods to recover the dissolved nickel and valuable base metals.

This may include oxidation of the contained iron, together with selective precipitation of valuable base metals via pH adjustment with lime or other suitable bases to raise the pH to the region of 5 to 6 to precipitate, in particular, dissolved iron. Alternatively, the valuable base metals may be recovered via cementation on iron or other suitable metals, via sulphide precipitation, or via solvent extraction. Furthermore, in relation to the calcine leach, dissolved magnesium remains in solution as long as the pH is kept below that required for its precipitation (approximately pH9). Dissolved silica will also remain in solution at these levels.

As indicated above, the dissolution of the valuable base metals and the minor levels of nickel during the acid leach may be minimised by the use of comparatively lower acid strengths and/or minimum excess acid conditions. In practical terms, these minimum acid conditions are always preferred in order to reduce acid costs. The maximum utilisation of acid is enhanced by the use of extended leach times.

The two aspects of the present invention will now be illustrated by examples. The first example relates to the acid leach of the flotation concentrates while the second example relates to the acid leach of the calcine.

The first aspect of the present invention may be illustrated by reference to the first example where nickel sulphide flotation concentrates from the Yakabindie nickel deposit were subjected to an acid leach with sulphuric acid. The minerals providing the nickel in these deposits include pentlandite, violarite, nickeliforous pyrrhotite, millerite and heazelwoodite. The extracted rock is subjected to a normal beneficiation process, which comprises crushing, grinding, flotation and thickening, to produce the nickel sulphide flotation concentrate. It should be understood that the generality of the invention as described above is not to be limited due to reference to the following specific examples.

Referring to Table 1, the control test (Test 0) shows that the nickel sulphide flotation concentrate has an initial nickel concentration of 18.0% and an initial magnesia (MgO) concentration of 10.5%. Tests 1 to 8 produced a residue having a nickel concentration ranging from 18.1% to 21.2%, which, due to the significant overall weight loss, correlates to a significantly higher grade concentrate. The tests also show a reduction in MgO concentration to levels ranging from 4.79% to 7.44%, which is mirrored by the significant overall weight losses of from 3.4% to 22.7%. The amount of nickel lost to the leach solution ranges from 1.5 to 3.6% of original contained nickel.

Acid strengths used in the leach ranged from 2.5 to 30% by weight. The benefits of the invention, in terms of MgO removal, were obtained at the lower strengths as well as at the higher strengths. As indicated earlier, the optimal process conditions will depend on the characteristic of the concentrate being treated, and it may ba that variations from the tested range of acid strengths will be preferred for nickel concentrates produced from different ore bodies.

The leach temperature for the Yakabindie concentrates of the example was in the region of 75 deg C. which assisted in promoting the magnesia dissolution rates. Of course, the process benefits may be obtained over a range of leach temperatures which may be from about ambient temperature to a temperature below boiling (at ambient pressure). While the tests were not conducted under increased pressure, application of pressure to the leach will also assist in promoting magnesia dissolution rates. Of course, an increased operating pressure will alter the preferred leaching temperature range.

Thus, the tests illustrated in Table 1 show that a significant reduction in MgO concentration is provided by the process of the present invention, together with a significant reduction in the overall weight of the concentrate. With the relative increase in nickel concentration, a nickel sulphide concentrate is produced which is economically attractive from a flotation concentrate traditionally considered unattractive.

The second aspect of the present invention may be illustrated by reference to the second example where nickel iron oxide calcine, produced after roasting of the acid leach residue obtained from the above example, is subjected to an acid leach with sulphuric acid.

Referring to Tables 2 and 3, the details of the control test (Test JK248) and of the experimental tests (JK233, 236, 235, 234, 249 and 253) indicate the range of conditions that may be successfully utilised.

Referring to Table 2, acid strengths of 10% and 20% were used over 4 hours at 25 deg C. to give respectively 60.2% and 71.8% extraction of Mg (tests JK233 and JK236). For the same acid strengths and leaching time, but at 75 deg C., the extraction figures increased to 72.5% and 84.1% respectively (tests JK235 and JK234). However, at this higher temperature there was also a greater loss of nickel into solution than at the lower temperature.

Further tests were conducted using 15% solids in the feed, rather than 30% solids as used for the above tests. These test (JK249 and JK253) were only conducted at 25 deg C. and with generally lower acid strengths and shorter leach times. With 2% and 5% acid used, the extraction figures for Mg were 53.4% and 27.3% respectively for a time of 1 hour.

Table 3 analyses the products of the acid leach. From this table the overall weight loss of each residue is also evident. As indicated above, this weight loss combined with the lower residue concentrations of Mg (ranging from 3.3% to 5.4%) and $SiO_2$ (ranging from 3.0% to 6.02%) correlates to a significantly higher grade calcine than is produced with traditional processing techniques.

The leach temperatures tested for the Yakabindie calcine in Tables 2 and 3 were 25 deg C. and 75 deg C. As for the above examples with the flotation concentrates, the temperature used in the acid leach is believed to promote dissolution rates. While the optimal temperature is considered to be ambient temperature (about 25 deg C.), it will be understood that the process benefits may again be obtained over a range of leach temperatures. Furthermore, application of pressure to the acid leach will also promote dissolution rates. However, it is clearly not necessary to pressure leach and from an economic viewpoint it is less desirable to pressure leach.

Those skilled in the art will appreciate that there may be many variations and modifications of the process and conditions described herein which are within the scope of the present invention.

TABLE 1

| TEST | ACID STRENGTH | WATER SOURCE | TIME Min | RESIDUE % Ni | RESIDUE % MgO | LEACH SOLN % Ni in leach feed | WEIGHT LOSS |
|---|---|---|---|---|---|---|---|
| 0 | — | — | — | 18.0 | 10.50 | — | — |
| 1 | 10% | Perth | 60 | 19.7 | 6.29 | 1.9 | 14.5 |
| 2 | 20% | Perth | 120 | 21.1 | 5.46 | 2.2 | 19.5 |
| 3 | 30% | Perth | 120 | 21.2 | 4.79 | 2.3 | 22.7 |
| 4 | 10% | Yakabindie | 60 | 19.4 | 6.45 | 2.4 | 9.4 |
| 5 | 5% | Yakabindie | 60 | 18.6 | 6.81 | 1.8 | 5.2 |
| 6 | 2.5% | Yakabindie | 60 | 18.1 | 7.44 | 1.5 | 3.4 |
| 7 | 10% | Yakabindie | 240 | 20.8 | 5.79 | 3.6 | 22.1 |
| 8 | 5% | Yakabindie | 60 | 19.7 | 7.13 | 1.9 | 12.4 |

TABLE 2

| Test No. | Conditions | Time Mins | Ore g | Site Water g | 98% H2SO4 g | Total Soln mL | Sample mL | Solution Ni g/l | Solution Fe g/l | Solution Mg g/l | Extraction Ni % | Extraction Fe % | Extraction Mg % | Residual H2SO4 g/l |
|---|---|---|---|---|---|---|---|---|---|---|---|---|---|---|
| JK248 | Water | 0 | 100.0 | 233.0 | 0.0 | 233.0 | | | | | 0 | 0 | 0 | 0.0 |
| | 30% Solids | 60 | | | | 213.0 | 20.0 | 0.001 | 0.000 | 0.050 | 0.00 | 0.00 | 0.7 | |
| | 75 C | 240 | | | | 193.0 | 20.0 | 0.001 | 0.000 | 0.060 | 0.00 | 0.00 | 0.8 | |
| JK233 | 10% Acid | 0 | 100.0 | 209.7 | 23.3 | 218.6 | | | | | 0 | 0 | 0 | 106.6 |
| | 30% Solids | 60 | | | | 198.6 | 20.0 | 2.63 | 1.32 | 20.4 | 2.03 | 0.96 | 59.4 | |
| | 25 C | 240 | | | | 178.6 | 20.0 | 3.20 | 1.43 | 20.7 | 2.43 | 1.03 | 60.2 | 9.8 |
| JK236 | 20% Acid | 0 | 100.0 | 186.4 | 46.6 | 204.6 | | | | | 0 | 0 | 0 | 227.8 |
| | 30% Solids | 60 | | | | 184.6 | 20.0 | 2.60 | 0.66 | 10.6 | 1.92 | 0.45 | 24.7 | |
| | 25 C | 240 | | | | 164.6 | 20.0 | 6.24 | 3.00 | 33.0 | 4.35 | 1.90 | 71.8 | 125.4 |
| JK235 | 10% Acid | 0 | 100.0 | 209.7 | 23.3 | 218.6 | | | | | 0 | 0 | 0 | 106.6 |
| | 30% Solids | 60 | | 233.0 | | 431.6 | 20.0 | 3.00 | 1.55 | 23.4 | 2.32 | 1.13 | 52.8 | |
| Diluted* | 75 C | 240 | | | | 411.6 | 20.0 | 3.65 | 0.75 | 15.2 | 5.78 | 1.18 | 72.5 | <0.05 |
| JK234 | 20% Acid | 0 | 100.0 | 186.4 | 46.6 | 204.6 | | | | | 0 | 0 | 0.0 | 227.8 |
| | 30% Solids | 60 | | | | 184.6 | 20.0 | 7.95 | 4.44 | 29.4 | 6.37 | 3.19 | 70.7 | |
| | 75 C | 240 | | | | 164.6 | 20.0 | 9.70 | 9.98 | 35.6 | 7.63 | 6.78 | 84.1 | 12.9 |
| JK249 | 5% Acid | 0 | 100.0 | 538.6 | 28.4 | 548.9 | | | | | 0 | 0 | 0 | 51.7 |
| | 15% Solids | 15 | | | | 528.9 | 20.0 | 0.74 | 0.45 | 6.79 | 1.53 | 0.81 | 44.7 | |
| | 25 C | 30 | | | | 508.9 | 20.0 | 0.86 | 0.52 | 7.59 | 1.77 | 0.93 | 49.8 | |
| | | 45 | | | | 488.9 | 20.0 | 0.98 | 0.56 | 8.09 | 2.00 | 1.00 | 52.9 | |
| | | 60 | | | | 468.9 | 20.0 | 1.06 | 0.59 | 8.19 | 2.15 | 1.05 | 53.4 | |
| | | 120 | | | | 448.9 | 20.0 | 1.27 | 0.70 | 9.40 | 2.52 | 1.22 | 60.3 | 30.9 |
| JK253 | 2% Acid | 0 | 81.8 | 455.1 | 9.3 | 454.4 | | | | | 0 | 0 | 0 | 20.5 |
| | 15% Solids | 5 | | | | 434.4 | 20.0 | 0.13 | 0.08 | 1.97 | 0.22 | 0.13 | 11.9 | |
| | 25 C | 10 | | | | 414.4 | 20.0 | 0.19 | 0.14 | 3.19 | 0.31 | 0.21 | 18.9 | |
| | | 15 | | | | 394.4 | 20.0 | 0.23 | 0.17 | 3.87 | 0.38 | 0.26 | 22.6 | |

TABLE 2-continued

| Test No. | Conditions | Time Mins | Ore g | Site Water g | 98% H2SO4 g | Total Soln mL | Sample mL | Solution Ni g/l | Solution Fe g/l | Solution Mg g/l | Extraction Ni % | Extraction Fe % | Extraction Mg % | Residual H2SO4 g/l |
|---|---|---|---|---|---|---|---|---|---|---|---|---|---|---|
| | | 30 | | | | 374.4 | 20.0 | 0.29 | 0.16 | 4.77 | 0.46 | 0.24 | 27.3 | |
| | | 60 | | | | 354.4 | 20.0 | 0.31 | 0.10 | 4.84 | 0.50 | 0.16 | 27.6 | 0.03 |

TABLE 3

| Test No. | Conditions | alcine Mass Initial g | alcine Mass Final g | Weight loss % | Residue Assay Ni % | Residue Assay Fe % | Residue Assay Mg % | Residue Assay Co % | Residue Assay S % | Residue Assay SiO2 % | Metal Extraction Ni % | Metal Extraction Fe % | Metal Extraction Mg % | Metal Extraction Co % |
|---|---|---|---|---|---|---|---|---|---|---|---|---|---|---|
| JK248 | Water 75 C | 100.0 | 100.0 | 0.0 | | | | Not Analysed | | | | | | |
| JK233 | 10% Acid 25 C | 100.0 | 89.9 | 10.1 | 30.7 | 33.1 | 3.3 | 0.78 | 0.87 | 3.00 | 2.4 | 1.0 | 60.2 | 7.7 |
| | Calculated Head | | | | 28.3 | 30.1 | 7.5 | | | | | | | |
| JK236 | 20% Acid 25 C | 100.0 | 84.9 | 15.1 | 31.2 | 34.5 | 2.9 | 0.80 | 0.71 | 3.34 | 4.3 | 1.9 | 71.8 | 10.6 |
| | Calculated Head | | | | 27.7 | 29.9 | 8.8 | | | | | | | |
| JK235* | 10% Acid 75 C | 100.0 | 87.1 | 12.9 | 30.6 | 34.0 | 3.1 | 0.80 | 0.72 | 3.47 | 5.8 | 1.2 | 72.5 | 8.3 |
| | Calculated Head | | | | 28.3 | 30.0 | 9.7 | | | | | | | |
| JK234 | 20% Acid 75 C | 100.0 | 80.0 | 20.0 | 29.5 | 33.2 | 1.7 | 0.79 | 0.78 | 6.02 | 7.6 | 6.8 | 84.1 | 16.8 |
| | Calculated Head | | | | 25.5 | 28.5 | 8.5 | | | | | | | |
| JK249 | 5% Acid 25 C | 100.0 | 88.3 | 11.7 | 29.3 | 34.1 | 3.8 | 0.82 | 0.82 | 3.56 | 2.5 | 1.2 | 60.3 | 4.7 |
| | Calculated Head | | | | 26.5 | 30.5 | 8.3 | | | | | | | |
| JK253 | 2% Acid 25 C | 81.8 | 75.6 | 7.6 | 28.6 | 31.5 | 5.4 | 0.78 | 0.59 | 5.40 | 0.6 | 0.2 | 33.8 | 5.8 |
| | Calculated Head | | | | 26.6 | 29.2 | 7.6 | | | | | | | |

We claim:

1. A method of processing intermediate nickel bearing products, said method comprising subjecting intermediate nickel bearing products selected from the group consisting of nickel sulphide concentrate and nickel iron oxide calcine to an acid leach in order to dissolve substantially all acid soluble magnesium bearing minerals contained therein to provide an upgraded nickel bearing residue and a leach solution.

2. A method according to claim 1 wherein the acid leach utilises sulphuric acid, hydrochloric acid or sulphurous acid.

3. A method according to claim 1 wherein the leach solution contains at least minor levels of dissolved nickel and valuable base metals, the method including the additional step of processing the leach solution to recover substantially all of the dissolved nickel and valuable base metals.

4. A method according to claim 3 wherein the step of processing the leach solution comprises oxidation of contained iron together with selective precipitation of the valuable base metals via pH adjustment with lime or other suitable bases to raise the pH to the region of 5 to 6 to at least precipitate the dissolved iron.

5. A method according to claim 1 wherein the dissolution of valuable base metals and minor levels of nickel during the acid leach are minimised by the use of comparatively lower acid strengths and/or minimum excess acid conditions.

6. A method according to claim 1 wherein the intermediate nickel bearing products are nickel sulphide concentrates and wherein the method subjects the nickel sulphide concentrates to an acid leach, the upgraded nickel concentrate residue providing a concentrate having a higher nickel concentration and a lower magnesia concentration than the initial concentrate.

7. A method according to claim 1 wherein the intermediate nickel bearing products are nickel iron oxide calcine and wherein the method subjects nickel iron oxide calcine to an acid leach, the upgraded calcine residue providing a calcine having a higher nickel concentration and a lower MgO/SiO$_2$ concentration than the feed nickel iron oxide calcine.

8. A method according to claim 1 wherein the intermediate nickel bearing products are from nickel ore bodies from dunite rock types which have been subjected to hydrothermal carbonate alteration.

9. A method according to claim 1 wherein the acid of the acid leach is sulphuric acid having a concentration in the range of 2.5 to 30% by weight.

10. A method according to claim 1 wherein the temperature of the acid leach is from about ambient temperature to a temperature below boiling, at ambient pressure.

11. A method according to claim 10 wherein the temperature of the acid leach is about 75 deg C.

12. A method of processing nickel sulphide concentrates, said method comprising extracting rock from a nickel or body, subjecting the extracted rock to normal beneficiation processes, said beneficiation processes including crushing, grinding, flotation and thickening, to produce a nickel sulphide flotation concentrate, and subjecting the nickel sulphide flotation concentrate to an acid leach using sulphuric acid in order to dissolve substantially all acid soluble magnesium bearing minerals contained therein to provide an upgraded nickel concentrate residue and a leach solution.

13. A method of processing nickel iron oxide calcine produced after roasting of an upgraded nickel concentrate residue, said method comprising subjecting the nickel iron oxide calcine to an acid leach with sulphuric acid, the upgraded calcine residue providing a calcine having a higher nickel concentration and a lower MgO/SiO$_2$ concentration than the feed nickel iron oxide calcine.

14. A method according to claim 13 wherein the upgraded nickel concentrate residue that is roasted is the upgraded nickel concentrate residue produced via the method of claim 12.

* * * * *